United States Patent [19]

Chevallier

[11] 3,968,291
[45] July 6, 1976

[54] DECORATIVE CONSOLIDATED LAMINATES AND A PROCESS FOR THEIR PREPARATION

[75] Inventor: Marcel Chevallier, Quillan, France

[73] Assignee: Formica International Limited, London, England

[22] Filed: Jan. 9, 1974

[21] Appl. No.: 431,912

[30] Foreign Application Priority Data
Mar. 2, 1973  France .............................. 73.07530

[52] U.S. Cl. ................................ 428/203; 428/204; 428/206; 428/211; 428/323; 428/328; 428/342; 428/524; 428/526; 428/530; 428/918; 428/208
[51] Int. Cl.$^2$ ......................... B32B 5/16; B32B 3/00
[58] Field of Search ........... 161/162, 263, 264, 164, 161/168, 1, 409; 260/39 R, 39 SB; 428/918, 525, 526, 524, 342, 530, 323, 328, 203, 204, 208, 206, 211

[56] References Cited
UNITED STATES PATENTS

| 2,732,325 | 1/1956 | Lindenfelser | 161/263 |
|---|---|---|---|
| 2,739,081 | 3/1956 | Wohnsiedler | 161/263 |
| 3,373,071 | 3/1968 | Fuerst | 161/264 |
| 3,451,837 | 6/1969 | Mork | 428/524 |
| 3,556,915 | 1/1971 | Stanley | 161/264 |
| 3,585,102 | 6/1971 | Burgess | 161/162 |
| 3,802,955 | 4/1974 | Powanda | 428/525 |

FOREIGN PATENTS OR APPLICATIONS

| 532,295 | 10/1956 | Canada | 260/39 R |
|---|---|---|---|
| 1,240,233 | 7/1971 | United Kingdom | 260/39 R |
| 1,197,726 | 7/1970 | United Kingdom | 161/162 |

*Primary Examiner*—Marion E. McCamish
*Assistant Examiner*—Ellis P. Robinson
*Attorney, Agent, or Firm*—Cushman, Darby & Cushman

[57] ABSTRACT

The invention relates to decorative plastics laminates with improved clarity in the wear surface layer. The laminates consist of a decorative paper sheet impregnated with a noble thermoset resin, the sheet being supported by a core layer; the sheet carries a coating of a noble thermoset resin and barium sulphate. The thermoset resin is preferably a melamine-formaldehyde resin.

7 Claims, No Drawings

DECORATIVE CONSOLIDATED LAMINATES AND A PROCESS FOR THEIR PREPARATION

This invention relates to decorative thermoset plastics laminates with improved clarity in the wear surface layer; it also relates to a process for preparing the laminates.

Decorative thermoset plastics laminates conventionally comprise three essential layers, a wear surface layer, a decorative layer beneath the wear layer and a rigidity-imparting core layer supporting the superimposed decorative and wear layers.

Commonly the wear layer comprises a translucent, thermoset resin-impregnated alpha cellulose paper sheet (referred to as an overlay); the thermoset resin being usually an aminotriazine-formaldehyde resin such as a melamine-formaldehyde resin.

Usually the decorative layer comprises a thermoset resin impregnated printed or plain coloured paper sheet; the thermosetting resin again is commonly an aminotriazine-formaldehyde resin such as melamine-formaldehyde resin.

The rigidity imparting core layer usually comprises a plurality of superimposed phenol-formaldehyde resin impregnated kraft paper sheets, the number and thickness of the sheets being selected so that the finished laminate possesses the desired thickness and rigidity.

Decorative plastics laminates having a wide variety of surface finishes and properties are available; as far as the surface finish or wear resistant properties are concerned, the surface wear layer is the critical layer of the laminate.

In the conventional surface wear layer, the overlay paper performs several important functions. Firstly, it acts as reinforcement for the resinous wear layer, the paper serving to consolidate the resin so that crazing or cracking is prevented. Secondly, it acts as a resin carrier facilitating the provision of the resinous wear surface layer above the decorative sheet. Thirdly, the overlay acts as a flow restrictor to limit the extent to which the resin in the wear surface layer penetrates into the decorative sheets during processing and hence serves to retain the resinous wear layer where it is required.

However, the use of such an overlay paper has certain disadvantages. Firstly, the overlay paper is expensive and the cost of labour, machinery, energy and material involved in treating the overlay paper with a thermosettable resin to convert it to a wear surface layer constitutes an appreciable proportion of the total costs incurred in preparing standard decorative laminates. Secondly, the overlay paper is not completely transparent and so obscures partially the decorative sheet giving a milky appearance to dark colours and hence detracting from the appearance of the finished laminate.

It has previously been proposed, when a decorative laminate having high abrasion resistance is desired, to eliminate the overlay sheet from the assembly and to provide the wear surface layer by coating the decorative sheet with a composition comprising a thermosettable resin, finely divided silica and finely divided fibrous cellulose. When still higher abrasion resistance is required, it has been proposed that the coating composition should comprise a thermosettable resin, a finely divided material having a Moh hardness of at least 9 and either finely divided microcrystalline cellulose or finely divided fibrous material. It has also been proposed, where high abrasion resistance is not a consideration, to provide a wear surface layer by coating the impregnated decorative sheet with a composition comprising a thermosettable resin, pulverised paper fibres and, optionally, pigment particles.

However, whilst these previously proposed techniques are useful in preparing, without the use of an expensive overlay, laminates having satisfactory craze and/or abrasion resistance, the clarity of the wear surface layer is generally not good. For whilst laminates prepared with such coating compositions often exhibit improved surface wear layer clarity over standard laminates comprising an overlay, the presence in the resins of materials, such as cellulose, having differing optical properties from that of the cured resin detracts somewhat from the clarity of the surface layer.

Clarity of the wear surface layer is desirable when the decorative effect is contributed by a printed or patterned decorative sheet as any lack of clarity detracts from the decorative effect. Even with plain coloured decorative sheets, clarity of the wear surface layer — albeit less important — is desirable as it enables the colour of the decorative sheet to be observed without reduced brightness.

This invention provides decorative plastics laminates having enhanced clarity of the wear surface layer without adversely affecting the other properties of the laminate surface. It also provides a process for producing the decorative laminates in which the material, machinery and labour costs are reduced by eliminating the use of conventional thermoset resin impregnated alpha cellulose overlay sheets. The decorative plastics laminates possess satisfactory properties, and have a reduced amount of thermoset resin, in the decorative and wear surface layers together, than that customarily employed in standard laminates comprising an overlay.

The above can be achieved by providing the wear surface layer of the laminate as a coating comprising a thermoset resin, finely, divided barium sulphate and, optionally, wear enhancing amounts of finely divided alpha alumina.

Laminates provided with such a wear surface layer exhibit satisfactory wear properties at low coating weights, and, surprisingly, it has been found that despite the absence of fibrous or microcrystalline cellulosic material, such a wear layer does not exhibit crazing or cracking to any marked extent.

The laminates of the invention comprise a decorative consolidated laminate comprising a decorative paper sheet impregnated with a first noble thermoset resin (as hereinafter defined), the sheet being supported by a core layer and carrying on the surface of the sheet remote from the core layer, a coating comprising a second noble thermoset resin and finely divided barium sulphate.

They can be prepared by a process in which a. a decorative paper sheet impregnated with a first noble thermosettable resin is coated with a composition comprising a second noble thermosettable resin and finely divided barium sulphate;

b. the impregnated and coated sheet is dried;

c. said sheet is assembled in superimposed relationship upon a core layer comprising one or a plurality of thermosettable phenol-formaldehyde resin impregnated paper sheets; and d. said assembly is consolidated by heat and pressure.

The first and second thermoset resins can be the same or different resins. The thermoset resin, should preferably be one with a refractive index that is approximately the same as that of the barium sulphate.

The barium sulphate employed may be any suitable grade such as the acid washed naturally occurring mineral barytes or the precipitated blanc fixe. However, irrespective of its source the barium sulphate should be as colourless and as translucent as possible. The refractive index of barium sulphate is 1.62 to 1.64 whilst that of cured melamine-formaldehyde resin is 1.63 – 1.67; this similarity in refractive indices of the two materials, together with the fact that both are colourless in the preferred form, ensures that the cured wear surface layer is highly transparent. Cellulosic material has a refractive index of about 1.57 and hence, in the previously known laminates having a wear surface layer comprising cellulose, the cellulosic material was discernible — albeit with difficulty — in the cured coating. This cellulosic material — whether as a preformed overlay sheet or as particulate cellulosic material — obstructs somewhat the passage of light through the wear surface layer and causes the loss of clarity thereof.

The particle size of the barium sulphate may vary over a wide range but preferably substantially all of the barium sulphate has a particle size less than 10 microns; it preferably has a maximum particle size of 2.5 microns, especially 1.5 microns.

The amount of barium sulphate employed in the coating composition may also be varied over a wide range; for example amounts of 80 to 150 parts by weight of barium sulphate per 100 parts by weight of resin solids may be used, but amounts of 110 to 140 parts are preferred.

Suitably the coating composition is prepared by mixing whilst agitating an aqueous or alcoholic solution of the thermosettable resin (e.g. an aminotriazine-formaldehyde resin especially a melamine-formaldehyde resin) with a suspension of the barium sulphate in water. The resin may be any such suitable thermosettable resin known for use in the production of decorative laminates that in the cured state is substantially colourless and transparent. If desired a curing catalyst (which optionally is a latent catalyst) may be employed in the coating composition; if a catalyst is employed then this may be incorporated into the composition by any suitable method.

The laminates of the invention may be provided with a highly abrasion-resistant wear surface layer if small amounts of suitable finely divided abrasion-resistant material, having a Moh hardness of at least 6, are included in the coating composition. The use of finely divided silica or finely divided alpha alumina is preferred where highly abrasion-resistant surfaces are required. The amounts of such abrasion-resistant materials employed should suitably be kept to as low a level as possible concomitant with the desired level of abrasion-resistance because such abrasion-resistant materials having refractive indices differing from that of the cured melamine-formaldehyde resin cause some loss of clarity of the wear surface layer. However, the coating compositions used in the invention give rise, at the same abrasion-resistant material contents, to wear surface layers of greater clarity than those coatings comprising cellulosic materials.

The use of colourless abrasion-resistant materials in amounts up to 20 parts by weight per 100 parts of resin solids in the coating composition is preferred.

The particle size of the finely divided abrasion-resistant materials employed is suitably not greater than 50 microns; preferably the particle size range is 1 to 30 microns and the average particle size is 12 to 25 microns.

The abrasion-resistant material may be incorporated in the coating composition in any suitable manner so as to provide a uniform dispersion.

The coating composition may also include a penetration control additive to alter the viscosity of the composition and to limit the extent to which the resins penetrate the decorative paper. The inclusion of such an agent has been found to improve the wear value for a given coating weight. (It is believed that this occurs because one effect of the additive is in limiting penetration of the composition so maintaining a thicker resin layer on the surface.) Examples of suitable additives are cellulosic derivatives such as carboxymethylcellulose and, more preferably, the alginates, notably sodium alginate, in an amount of 0.1 to 2.0%, preferably 0.2 to 0.75%, of the total weight of the coating composition. Alginates not only exert a gelling influence on the compositions but also reduce the wetting capacity of the resin, whilst carboxymethylcellulose has only the first effect.

The decorative sheet must, prior to coating with the barium sulphate-containing composition, be impregnated with a noble thermosettable resin, e.g. a melamine-formaldehyde, a urea-formaldehyde or a melamine-urea-formaldehyde resin. (The term "noble" is conventionally employed in the art to designate those thermosettable resins which do not undergo any appreciable colour deterioration during the heat and pressure consolidation step used in the preparation of the laminate.) This impregnation is suitably carried out by known techniques and the impregnated sheet may be coated with the surface coating composition with or without an intermediate drying step. Similarly the coating may be carried out in any suitable manner so that neither the coating composition as a whole nor any of its substituents penetrates the decorative paper to any substantial extent. For example, the coating composition may be applied to the impregnated paper by a knife coater, by a reverse roll coater or by spraying.

After coating, the treated sheet is dried to reduce the content of volatile materials in the coated impregnated sheet to a level suitable for the subsequent laminating operations. The content of volatile materials is preferably reduced to 3% to 6%, especially to about 4.5% by weight.

The decorative sheet can be impregnated so as to provide, in the dried impregnated sheet, a resin content of 30 to 60%, preferably 35 to 45% by weight.

The coating composition may be applied at any suitable coating weight, but suitably the coating weight, after drying, is 10 to 50, preferably 20 to 40 and especially 25 to 35, grams per square meter (g.s.m.).

The process of the invention may be performed in any suitable form of apparatus, particularly that normally used in the production of standard laminates. In such apparatus, the sheet material employed in the production of the laminates is impregnated, coated and dried whilst in web form so as to facilitate continuous production and the treated web after drying is then cut into sheets having the required dimensions.

The invention is illustrated by the following Examples wherein all parts and proportions are by weight.

EXAMPLE I

500 Parts of a spray dried melamine-formaldehyde resin having a melamine to formaldehyde ratio of about 1:2 was dissolved in 500 parts of water at 30° to 40°C. with stirring; to the stirred solution was added 900 parts of a 70% aqueous dispersion of blanc fixe brilliant.

A high grade woodgrain printed decorative laminating paper was impregnated with a conventional melamine-formaldehyde laminating resin and dried; the dried paper had a resin content of 40%. The dried impregnated paper was then reverse roller coated with the coating composition prepared as above and then dried so as to provide a dry coating of 30 g.s.m. on the printed side of the decorative web, the content of volatile material in the dried coated web being 4.5%.

The web was cut into sheets of the desired size and then assembled in superimposed relationship upon a stack of conventional thermosettable phenol-formaldehyde resin impregnated kraft paper sheets and the whole assembly consolidated to a unitary structure in a hydraulic press with heated platens using those operating conditions and equipment customarily employed for the production of conventional laminates.

The laminate thus produced exhibited a "bright" woodgrain appearance and, when compared with laminates produced using the same print sheet but prepared with (a) a conventional overlay sheet and (b) by employing a coating composition comprising, per 100 parts by weight of the same melamine-formaldehyde resin, 20 parts by weight of finely divided fibrous cellulose and 20 parts of finely divided silica, it was observed that the clarity of the wear surface layer in the laminates of the invention was greater than the corresponding layers of the comparison laminates.

EXAMPLE II

A plain coloured decorative laminate was prepared by impregnating a high quality plain coloured impregnating paper web with a conventional malamine-formaldehyde laminating resin varnish and the web dried to give an impregnated sheet having a resin content of 40% and a volatile content of 4.0%.

The dried impregnated web was then spray coated using the coating composition described in Example I and the coated web dried to give a web having a coating weight of 30 g.s.m. and a volatile content of 4.4%. A sheet was cut from the web and assembled upon a stack of phenol-formaldehyde impregnated core sheets and pressed to form a laminate as in Example I. Again the product laminate had an appearance of greater "brightness" than a laminate having a conventional overlay paper, due to the high degree of clarity of the wear surface layer.

EXAMPLE III

A plain coloured decorative laminate was prepared as in Example II except that the coating composition comprised also 45 parts of finely divided fused alpha alumina, substantially all of which had a particle size of 1 to 30 microns.

When compared with an abrasion resistant laminate prepared by coating the impregnated sheet with a composition comprising, per 100 parts of a melamine-formaldehyde resin, 20 parts of cellulosic fibre and 10 parts of finely divided fused alumina, it was observed that the wear surface layer of the laminates according to the invention had greater clarity than the comparison laminate.

We claim:

1. In a decorative consolidated laminate consisting of a rigidity imparting core layer, a decorative paper sheet impregnated with a noble thermoset resin supported on the core layer, and a wear surface layer on the decorative sheet, the decorative paper sheet being clearly visible through the wear surface layer, the improvement wherein the wear surface layer comprises a thermoset noble resin selected from the group consisting of melamine-formaldehyde, urea-formaldehyde and melamine-urea-formaldehyde thermoset resins, particles of barium sulphate substantially all of which have particle sizes less than 10 microns and, optionally, up to 20 parts by weight per 100 parts of resin solids of a finely divided colourless abrasion-resistant material which is silica or $\alpha$-alumina having a maximum particle size not greater than 50 microns.

2. A laminate as claimed in claim 1 wherein said abrasion-resistant material has a particle size range of 1 to 30 microns and an average particle size of 12 to 25 microns.

3. A laminate as claimed in claim 1 wherein said barium sulphate has a maximum particle size of 2.5 microns.

4. A laminate as claimed in claim 3 wherein said barium sulphate has a maximum particle size of 1.5 microns.

5. A laminate according to claim 1 wherein the coating weight on said decorative sheet is 10 to 50 grams per square meter.

6. A laminate as claimed in claim 1 wherein said coating weight is 25 to 35 grams per square meter.

7. A laminate as claimed in claim 1 wherein said decorative sheet bears a printed pattern or design, or is a plain coloured sheet.

* * * * *